United States Patent [19]

Poncelet et al.

[11] Patent Number: 5,910,400
[45] Date of Patent: Jun. 8, 1999

[54] ANTISTATIC COMPOSITION AND PHOTOGRAPHIC ELEMENT CONTAINING A LAYER OF THIS COMPOSITION

[75] Inventors: Olivier J. Poncelet; Jeannine Rigola, both of Chalon-Sur-Saone, France

[73] Assignee: Eastman Kodak Company, Rochester, N.Y.

[21] Appl. No.: 09/031,155

[22] Filed: Feb. 26, 1998

[30] Foreign Application Priority Data

Mar. 12, 1997 [FR] France ................................... 97 03231

[51] Int. Cl.$^6$ ....................................................... G03C 1/89
[52] U.S. Cl. ........................ 430/529; 430/527; 430/530; 430/531; 430/538; 252/518; 423/328.1; 423/328.2; 423/330.1
[58] Field of Search ..................................... 430/527, 529, 430/530, 531, 538; 252/518; 423/328.1, 328.2, 330.1

[56] References Cited

U.S. PATENT DOCUMENTS

| 4,495,276 | 1/1985 | Takimoto et al. | 430/527 |
| 5,104,779 | 4/1992 | Saverin | 430/527 |
| 5,714,309 | 2/1998 | Poncelet et al. | 430/527 |

FOREIGN PATENT DOCUMENTS

| 2 740 465 | 4/1997 | France . |
| 2 740 466 | 4/1997 | France . |
| 96/13459 | 5/1996 | WIPO . |

OTHER PUBLICATIONS

Research Disclosure No. 18904; entitled "Antistatic Compositions Comprising Crosslinkable Latex Binders"; Jan. 1980; pp. 29–31.
Research Disclosure No. 24732; entitled "Photosensitive Materials"; Nov. 1984; 550–553.
Research Disclosure No. 316116; entitled "Anti–Static Layers For Photographic Materials"; Aug. 1990; p. 687.
Research Disclosure No. 36544; entitled "Photographic Silver Halide Emulsions, Preparations, Addenda, Systems And Processing"; Sep. 1994; pp. 501–541.

*Primary Examiner*—Richard L. Schilling
*Attorney, Agent, or Firm*—Carl F. Ruoff

[57] ABSTRACT

The invention concerns a homogeneous aqueous film-forming composition comprising a latex and an inorganic antistatic substance. The latex can be a polystyrene, and the antistatic substance is an inorganic fibrous polymer with the formula $Al_xSi_yO_z$ where x:y is between 1 and 3 and z between 2 and 6. This composition is useful for the production of antistatic layers for photographic materials.

10 Claims, No Drawings

ANTISTATIC COMPOSITION AND PHOTOGRAPHIC ELEMENT CONTAINING A LAYER OF THIS COMPOSITION

FIELD OF THE INVENTION

The present invention concerns an antistatic coatable composition, and a photographic element comprising an antistatic layer obtained from this composition.

BACKGROUND OF THE INVENTION

When motion picture and still photographic films are subjected to physical and mechanical handling or treatments, involving friction, there is a build-up of static electricity on the surface of these films. This static electricity leads to dust being fixed on the surface of the film with to a risk of discharge, sparking or even ignition when the charge becomes high. These phenomena are particularly detrimental to the quality of the final image. For this reason, a great number and variety of substances have been proposed in the prior art as antistatic agents. These substances are mixed with various carriers, binders or additives in order to produce antistatic compositions which are then used to form antistatic layers on photographic supports, elements or materials. A review of antistatic agents useful in photography is given in Research Disclosure, No 501, September 1994, publication 36544, page 520 and in Research Disclosure No 316, dated 1990, p. 687.

There is also in Research Disclosure No 247, dated 1984, p. 550, a description of silicon-containing polymers which improve antistatic properties, adhesion between constituent layers, and coatability onto photographic elements.

The very abundance of the substances proposed as antistatic agents in these publications suggests that it is difficult to find antistatic substances which afford complete satisfaction. Some substances interreact with the components of the photographic material and the image formation mechanism, others have insufficient stability, or exude from the layers where they were incorporated, others are difficult to formulate because they require grinding and dispersal operations with organic solvents, and finally many have insufficient antistatic action.

Antistatic compositions for photographic materials, comprising dispersions of a particulate, water-dispersible; conductive polymer, and latex are described in Research Disclosure No 189, dated 1980, p. 29 to 31. A typical composition contains ethylene glycol dimethacrylate-N-vinylbenzyl-N,N,N-trimethylammonium chloride (7:93% mole) and 2-chloroethyl methacrylate-glycidyl methacrylate-lauryl methacrylate (49:20:31). These components, when they are subjected to certain conditions, provide an optically clear layer which is conductive and resistant to abrasion.

The applicant recently discovered a novel substance which is a fibrous inorganic polymer of aluminium and silicon, and has antistatic properties. This substance and a method for its synthesis are described in PCT patent application EP 9504165 (95935962.1) and entitled "New polymeric conductive alumino-silicate material, element comprising said material and process for preparing it".

The object of the present invention is a novel antistatic composition using the substance of the aforementioned patent application, having improved mechanical properties.

SUMMARY OF THE INVENTION

The antistatic composition according to the invention is a homogenous aqueous film-forming composition which comprises:

(i) a fibrous polymeric silico aluminate having the formula $Al_xSi_yO_z$ where x:y is in the range from 1 to 3, and z is in the range of from 2 to 6, and (ii) a latex having surface functions capable of conferring a pH below 7 to an aqueous solution of this latex, said latex being substantially free of groups capable of chelating the aluminium combined in the polymeric silico aluminate.

DESCRIPTION OF THE PREFERRED EMBODIMENTS

According to the present invention, the latex is in an aqueous solution. The latex is a stable dispersion of a polymer in an aqueous medium. It is a heterogeneous system, comprising a solid phase and an aqueous phase. The solid phase consists of small particles of polymer, in dispersion in the aqueous phase. The latexes are opaque liquids, usually white, which, when they are coated in thin layers, are transparent.

It can be seen in Research Disclosure of 1979, No 188, p. 703, that latex-based compositions enable the amount of active component incorporated in such compositions to be increased appreciably.

The polymer latex of the composition according to the invention, when admixed with the polymeric silico-aluminate, preserves the fibrous structure of the latter together with the Si/Al ratio, and therefore the intrinsic antistatic characteristics of the substance. This is why one of the requirements according to the invention is the absence, in the polymer latex, of chelating groups which, by capturing the Al ions, would degrade the structure of the silico-aluminate and as a result its antistatic properties. The latex should provide a coatable composition which is able to be formed into layers by the usual techniques; in particular, this composition should have a sufficient viscosity. The levels of viscosity required for the application of the various layers of a photographic product are well known. Depending on the purpose of the layer (backing, substratum, top layer), normally skilled persons will therefore adjust the viscosity of the coating composition using the usual parameters—concentration, thickening agents, etc. After drying, the layer obtained should exhibit appropriate adhesion for the support and the other layers of a photographic material.

The compatibility of the latex with the alumino-silicate is an important characteristic. Apart from what is indicated above, a latex incompatible with the alumino-silicate leads to a decantation of the mixture and thus would generate coating defects. This decantation also leads to aggregations and an increase in the size of particles. Finally, the mixture thus obtained from a non-compatible latex is opalescent, which is not suitable if layers transparent to visible radiation are to be obtained. The latex chosen according to the invention with acidic surface functions, is compatible with the alumino-silicate.

Useful polymer latexes therefore comprise latexes which have acidic surface functions which offer no chelating possibility such as for example $SO_3H$ and COOH functions grafted onto polymers such as styrene polymers or copolymers, e.g. polystyrene, poly(methyl-styrene), or onto other substituted styrene polymers or copolymers, i.e. with substituents on the aliphatic chain and/or on the aromatic ring, or other vinyl or acrylic polymers or copolymers such as partially hydrolysed polyacrylates or polymethacrylates. The polymers and copolymers preferably are in a particulate form and have a mean particle diameter below 1 $\mu m$, advantageously below 0.5 $\mu m$ and even more advantageously below 0.2 $\mu m$. According to a particular embodiment, the latex is a particulate monodisperse substance.

In the composition according to the invention, the silico-aluminate is a fibrous substance, described in the aforementioned PCT patent application EP 9504165. According to this patent application, the silico-aluminate is obtained by a method comprising the following principal steps:

(a) a mixed alkoxide of aluminium and silicon, or a precursor of such an alkoxide, is mixed with an aqueous alkali, at a pH between 4 and 6.5 and advantageously between 4–6 and 5–6, keeping the aluminium concentration between $5 \times 10^{-4}$ M and $10^{-2}$ M, (b) the mixture obtained at (a) is heated to a temperature below 100° C. in the presence of silanol groups, for example in the form of divided silica, for a sufficient period in order to obtain a complete reaction resulting in the formation of a polymer, and (c) the ions are eliminated from the reaction medium obtained at (b).

The reaction at step (b) is regarded as complete when the reaction medium no longer contains any cation other than those of the alkali, that is to say when the Al and Si ions have been consumed.

According to one embodiment, the initial product, at step (a), is a precursor which is the product of the hydrolysis reaction of an aluminium salt, for example aluminium chloride, and a silicon alkoxide.

The alumino-silicate (expressed as total Al+Si) represents between 20 and 95% and preferably between 50 and 57% by weight, with respect to the total dry weight of the composition. This represents a latex/Al+Si ratio by weight of between 10 and 75%, and advantageously between 15 and 50%.

If the latex/alumino-silicate ratio is too high, the conductive properties are reduced and the efficacy of the composition as an antistatic falls. If the latex/alumino-silicate ratio is too low, the composition, once applied in a layer, adheres poorly to the adjacent layers, and part of the alumino-silicate can also migrate into these adjacent layers.

If the latex/alumino-silicate ratio is high and the diameter of the particles is small and if the surface function is acidic, the conductive properties are increased and the efficacy of the composition as an antistatic rises.

The composition according to the invention can contain various additives generally used in compositions of this type and designed to improve either the antistatic properties, for example doping agents or agents improving conductivity, such as lithium, calcium, magnesium or alkaline-alkaline earth salts, or the characteristics which promote coating, for example thickeners, wetting agents, surfactants or preservatives. Examples of additives and published literature references concerning them are given in Research Disclosure, publication No 36544, September 1994, Chapter IX, "Coating physical property modifying addenda", pages 519–520. As regards metallic cations, it is preferable for them not to be present in the initial stage in the polymer latex. It is also necessary to avoid the surfactants being positively charged since this could prevent a formulation with the alumino-silicate.

Preferably, as has been indicated, the polymer latex provides a solution which is applicable in a layer according to conventional techniques where necessary in the presence of layering additives, thickening agents or surfactants. The layer is obtained from the composition by the usual coating techniques, hopper, plate or curtain coating, etc. The layer obtained has a thickness, after drying, of between 0.1 μm and 10 μm; layers of lesser thicknesses can be envisaged. The layer is transparent, although this is not essential in the case of certain photographic products in which the antistatic layer is, for example, applied to the back of an opaque support. The resistivity of the layer is between $10^9$ and $5 \times 10^9$ ohms, preferably at room temperature and at a relative humidity of between 40 and 60% and advantageously between 45 and 55%.

The composition according to the invention may be applied to the preparation of backing layers, substrata, intermediate layers or top layers, in any type of photographic product in which there is a need for an antistatic layer, in particular, but not exclusively, a transparent, permanent antistatic layer, that is to say a layer which retains, following the processing of the exposed photographic product, at least some of its antistatic properties, sufficient for avoiding for example drawbacks related to dust and dirt liable to be deposited on the surface of this product. The support of the product can consist of the substances described in Research Disclosure, the aforementioned publication, Chapter XV, page 531, in particular the polyester Estar®, the latter having a resistivity of $10^{12}$ ohms.

The following examples illustrate the invention.

EXAMPLE 1

A solution of alumino-silicate and methacrylate latex was prepared in order to evaluate the adhesion of the emulsion layers on the imogolite layers.

The alumino-silicate solution used was prepared according to the procedure of example 1 of application EP 9504195 and had an (Al+Si) concentration of 3.348 g/l. 915.85 g of this alumino-silicate was added to 500 g of a solution composed of 10.73 g of latex and water and to 617 g of H$_2$O. This mixture was stirred for 30 minutes. The estimated final (Al+Si) concentration was 1.5 g/l.

This solution was coated on an ESTAR® support.

The alumino-silicate and latex formulation presented very good suitability for coating either directly on the support, or on to the surface of an emulsion layer. The estimated coverage was 80 mg/m$^2$ (Al+Si).

The resistivity was measured at 22° C. at a relative humidity of 25%. When the alumino-silicate and latex solution were coated onto the support alone, without emulsion, or as a backing, the resistance measured was around $10^{10}$ ohms. The resistance retained a sufficient value to provide the product with antistatic protection.

An adhesion test is also carried out as follows: on a sample of film with an incipient tear, an adhesive film (a film having as even an adhesion property as possible, and not highly sensitive to ageing, such as 3M®-850 film) was applied, and the adhesive is removed sharply. The adhesion was considered good when the adhesive contained no alumino-silicate and latex formulation; the adhesion was considered poor when the adhesive took with it the antistatic layer from the support.

This test revealed good adhesion of the alumino-silicate and latex mixture on the support.

EXAMPLE 2 a) 3.62 g of Estapor® K5015 latex at 1% was added (the parent solution of latex was at 10%) to 12.33 g of osmosed H$_2$O. A pH of 6.48 was obtained for this solution (latex+H$_2$O) at 20.8° C.

The latex solution was then mixed with the alumino-silicate. The polymeric alumino-silicate was obtained as indicated in exemple 1 above. The alumino-silicate solution contained 6.035 g/l of Al+Si. 20 g of the solution was used, which corresponds to 120.70 mg of Al+Si.

After mixing this latex solution with the alumino-silicate, the pH was 4.05.

0.1 mm-thick blade coating on ESTAR® was performed.

The final (Al+Si) concentration was 2.5 g/l.

The ratio by weight of the Estapor® K5015 latex with respect to (Al+Si) was 30%.

b) The same test was performed, except that a ratio of 15% of Estapor® K5015 latex with respect to (Al+Si) was used.

EXAMPLE 3 a) Estapor® K1080 latex was used at a concentration of 10%. Same alumino-silicate as in example 2, in the quantity defined above was used, and to this mixture was added 3.62 g of a 1% Estapor® K1080 solution and 24.66 g of osmosed $H_2O$. The pH of the Estapor® K1080 latex and $H_2O$ solution was equal to 6.03 at 22° C.

There was 30% of Estapor® K1080 latex with respect to (Al+Si).

The pH of the mixture was 4.41 at 22° C.

The (Al+Si) concentration was 2.5 g/l.

b) The same experiment was reproduced with an Estapor® K1080 latex/(Al+Si) ratio equal to 15%. 1.81 g of the 1% Estapor® K1080 latex solution and 26.47 g of osmosed $H_2O$ were mixed.

The pH of the mixture was 4.48 at 21.2° C. The mixture had a concentration of 2.5 g/l for (Al+Si).

Estapor® polystyrene latexes manufactured by Prolabo have the following characteristics:

|  | Latex used | Acidic surface function | Number of functions/$\mu m^2$ | Diameter of particles ($\mu m$) |
|---|---|---|---|---|
| Ex. 1 | K5015 Estapor® | $SO_3H$ | $6.82 \times 10^2$ | 0.15 |
| Ex. 2 | K1080 Estapor® | COOH | $1.5 \times 10^{11}$ | 0.5 |

Measurements of surface resistivity were then performed at a relative humidity (RH) of 45% and at a temperature of 22.2° C. This kinetic measurement of the charges was performed according to the following operating method: a sample of film measuring 270×35 mm was disposed between two electrodes. The ends of the sample rest on these two electrodes. Then a voltage was applied between the two electrodes, and a resistance value in ohms was read off.

An emission spectrometry known as ICP (Ionised Coupling Plasma) was also performed.

| Examples | R ($10^9 \Omega$) 3 days | R ($10^9 \Omega$) 1 h at 45% RH | R ($10^9 \Omega$) 24 h at 45% RH | R ($10^9 \Omega$) 27 h at 45% RH | 15 days at 35% RH | ICP analysis mg/$m^2$ |
|---|---|---|---|---|---|---|
| Ex. 2-a | 1.86 | 1.61 | 2.90 | 3.08 | 1.83 | 203 |
| Ex. 2-b | 2.01 | 1.67 | 1.92 | 1.62 | 1.71 | 215 |
| Ex. 3-a | 1.42 | 1.49 | 1.54 | 1.52 | 1.91 | 228 |
| Ex. 3-b | 1.87 | 1.94 | 1.68 | 1.79 | 2.35 | 217 |

The analysis measurements show that the layers with latexes with acidic surface functions are not opalescent and have good adhesion.

We claim:

1. An homogeneous aqueous antistatic film-forming composition comprising:
   1) a fibrous polymeric silico-aluminate with the formula $Al_xSi_yO_z$ wherein x:y is in the range of from 1 to 3 and z is in the range of from 2 to 6, and
   2) a latex having surface functions capable of conferring a pH below 7 to an aqueous solution of this latex, said latex being substantially free of groups capable of chelating the aluminium combined in the polymeric silico aluminate.

2. The composition of claim 1, wherein the surface functions are acidic functions.

3. The composition of claim 2, wherein the surface functions are COOH or $SO_3H$ functions.

4. The composition of claim 3, wherein the acidic functions are grafted onto a styrene polymer or copolymer.

5. The composition claim 1, wherein the latex has a mean particle diameter below 1.0 $\mu m$.

6. The composition of claim 5, wherein the latex has a mean particle diameter below 0.2 $\mu m$.

7. The composition of claim 1, wherein the polymeric silico-aluminate has been obtained by the following method:
   a) a mixed alkoxide of aluminium and silicon, or a precursor of such an alkoxide, is mixed with an aqueous alkali, at a pH between 4 and 6.5, keeping the aluminium concentration between $5 \times 10^{-4}$ M and $10^{-2}$ M;
   b) the mixture obtained at (a) is heated to a temperature below 100° C., for a sufficient period in order to obtain a complete reaction resulting in the formation of a polymer, and
   c) the salts are eliminated from the reaction medium obtained at (b).

8. The composition of claim 1, wherein the latex and the total Al+Si of the polymeric silico-aluminate have a ratio by weight of from 10 to 75%.

9. The composition of claim 8, wherein the latex and the total Al+Si of the polymeric silico-aluminate have a ratio by weight of from 15 to 50%.

10. A Photographic element comprising a support, at least one layer of light-sensitive silver halide emulsion, and at least one layer of the composition of claim 1.

* * * * *